3,332,978
SULFATE ESTERS OF HINDERED ALCOHOLS
John R. Caldwell, Kingsport, Tenn., assignor to Eastman Kodak Company, Rochester, N.Y., a corporation of New Jersey
No Drawing. Filed Oct. 17, 1963, Ser. No. 317,068
8 Claims. (Cl. 260—458)

This invention relates to novel sulfate esters of hindered alcohols of the neopentyl type and more particularly to sulfate and acid sulfate esters of neopentyl alcohol derivatives which, because of properties inherent in the neopentyl structure, are particularly valuable for use under conditions that tend to promote hydrolytic or thermal decomposition.

Water soluble alkyl sulfate salts have been proposed for use as surface active agents, additives for synthetic lubricants, etc., and other uses. One particular class proposed in the prior art is represented by the acid sulfate derivatives of the partial esters of glycols and glycerin. It is well known that the acid sulfate esters of these prior art glycol and glycerin derivatives are relatively unstable toward hydrolysis and thermal decomposition making them generally unsuited for such uses as wetting agents, extreme pressure lubricants, and plasticizers under extreme conditions. As will be more fully set forth hereinafter, after extended investigation I have found that by treating certain neopentyl alcohol derivatives with suitable sulfating agents, neutral and acidic esters are formed which are highly stable toward both hydrolysis and thermal decomposition and accordingly are appropriate for the aforementioned uses.

This invention has as an object to provide novel sulfate esters from cyclic alcohols having a highly hindered or blocked structure which greatly reduces their hydrolysis rate and also renders them resistant to thermal decomposition.

A further object is to provide novel compounds that contain within their structure a sulfate group which is derived from a neopentyl hydroxyl group of a cyclic compound.

A still further object is to provide such compounds which, because of their thermal and hydrolytic stability, are especially useful as wetting agents, extreme pressure lubricants, additives for increasing the lubricity of synthetic lubricants, surfactants, emulsifying agents, degreasing agents and plasticizers and the like.

A still further object is to provide neutral esters from cyclic alcohols having a neopentyl structure which are valuable as plasticizers, hydraulic fluids, selective solvents and synthetic lubricants.

Another object is to provide acid sulfate esters derived from cyclic alcohols having a neopentyl structure which are valuable as catalysts, surface active agents and as additives for extreme pressure lubricants.

Another object is to provide salts of acid sulfate esters prepared from cyclic alcohols having a neopentyl structure useful as surfactants and components of high temperature lubricants.

Another object is to provide neutral and acid sulfate esters which are valuable as extractants and selective solvents for purifying and concentrating compounds of uranium and other metals.

Another object is to provide acid sulfate esters which have particular value in the concentration of ores by the flotation process.

Other objects will appear hereinafter.

The above stated objects are accomplished by our invention which involves the provision of sulfate and acid sulfate esters of cyclic neopentyl alcohols. Such compounds are represented by the following structural formulae:

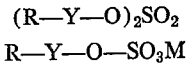

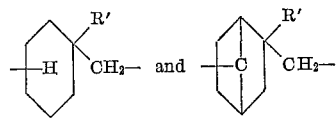

wherein R is a substituent selected from the group consisting of hydrogen and straight and branched chain alkyl radicals containing from 1–10 carbon atoms, cycloalkyl radicals containing from 5–12 carbon atoms, aryl and alkylated aryl groups containing 6–10 carbon atoms and wherein Y is selected from the group consisting of

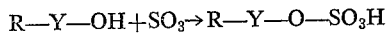

wherein R' is an alkyl group containing 1–4 carbon atoms, and wherein M is an ion selected from the class consisting of hydrogen, the alkali metals, the alkaline earth metals and amines.

The cyclic neopentyl alcohol derivatives used for preparation of the invention are obtained by the well known Diels-Alder reaction starting with butadiene and cyclopentadiene or suitable derivatives of these dienes. The diene is condensed with an unsaturated alcohol or aldehyde as described in Organic Reactions, vol. IV, Adams, John Wiley and Sons, New York, 1948, page 60. The residual double bond is catalytically hydrogenated by known methods. If an aldehyde is used as a starting material, the carbonyl group is catalytically hydrogenated to the alcohol. These hydroxyl-containing compounds can be used for the production of both acid sulfate and neutral sulfate derivatives.

The acid sulfate derivatives are prepared by well known methods employing sulfur trioxide, fuming sulfuric acid, concentrated sulfuric acid or chlorosulfonic acid as the sulfating acid.

The neutral sulfate derivatives are also prepared by well known methods such as by treatment with sulfuryl chloride, excess sulfur trioxide or fuming sulfuric acid.

The preparation of the acid sulfate derivatives may be represented by the equation

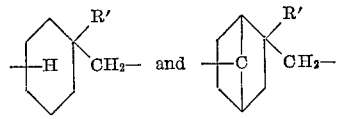

wherein R is a substituent selected from the group consisting of hydrogen and straight and branched chain alkyl radicals containing from 1–10 carbon atoms, cycloalkyl radicals containing from 5–12 carbon atoms, aryl and alkylated aryl groups containing 6–10 carbon atoms; and wherein Y is selected from the group consisting of

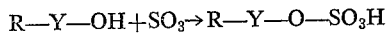

wherein R' is an alkyl group containing 1–4 carbon atoms.

This class of compounds can be converted to salts of the structure

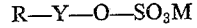

by reaction of the acid sulfate with metal hydroxides such as sodium, potassium and lithium hydroxides, metal oxides such as calcium, magnesium, barium and zinc oxides and amines such as mono, di- and tributyl amines, monoethanol amine, triethanolamine, dodecylamine, and the like.

The prepaartion of the neutral sulfate esters may be represented by the equation

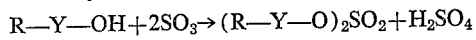

wherein R is a substituent selected from the group consisting of hydrogen and straight and branched chain alkyl radicals containing from 1–10 carbon atoms, cycloalkyl radicals containing from 5–12 carbon atoms, aryl and alkylated aryl groups containing 6–10 carbon atoms and wherein Y is selected from the group consisting of

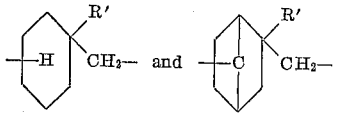

wherein R' is an alkyl group containing 1–4 carbon atoms.

In the following examples and description I have set forth several of the preferred embodiments of my invention but they are included merely for purposes of illustration and not as a limitation thereof.

EXAMPLE I 2-mehtyl-2-cyclohexanemethanol was treated with two molecular proportions of sulfur trioxide to give the dialkyl sulfate having the structure:

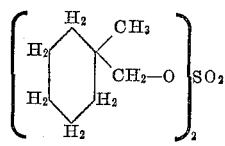

The product was useful as a plasticizer and as a selective solvent for extracting uranium salts from aqueous solutions.

EXAMPLE II 2-methyl-2-norcamphanemethanol was treated with 1 mole of sulfur trioxide in dioxane at 0° and the product was neutralized with barium hydroxide in water to give the salt

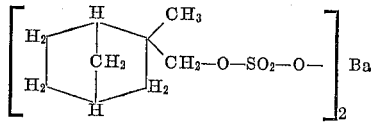

This salt is useful for increasing the lubricity of synthetic lubricants. Three parts of the salt were added to 97 parts of 2,2-dimethyl-1,3-propanediol dipelargonate. The lubricity, especially under heavy load, was greatly increased. The magnesium and calcium salts had similar properties.

The free acid was useful as an ore flotation agent.

EXAMPLE III 2-methyl-3-phenyl-2-norcamphanemethanol was treated with one mole of sulfur trioxide in ethylene dichloride solution at 0° to form the acid sulfate. The lithium, sodium, potassium and monoethanolamine salts were soluble in water and had strong detergent action. The alkali metal salts showed substantially no hydrolysis when boiled in water at a pH of 12 for several hours.

The N,N-diethylcyclohexylamine salt was valuable as an additive for extreme pressure lubricants.

EXAMPLE IV 2-butyl-2-cyclohexanemethanol was treated with one mole of chlorosulfonic acid in ethylene dichloride solution at 10–20° C. to form the acid sulfate. This compound was valuable as an ore flotation agent.

The alkaline earth metal salts were valuable as additives for extreme pressure lubricants.

EXAMPLE V

Decylcyclopentadiene was condensed with methacrolein by the Diels-Alder reaction and the product was hydrogenated with Raney nickel catalyst to produce decyl-2 - methyl - 2 - norcamphanemethanol. The alcohol was treated with one mole of sulfur trioxide-pyridine complex to form the acid sulfate having the structure

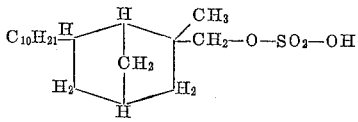

The soduim salt was formed by treatment of the acid sulfate with aqueous sodium carbonate. The salt was a powerful surfactant and emulsifying agent. It was particularly valuable for use in strongly alkaline solutions.

The excellent stability of the compound was demonstrated as follows. Two g. of the sodium salt, 2 g. of sodium hydroxide and 50 cc. of water were refluxed for 6 hours. A sample was taken from the flask and the excess sodium hydroxide was titrated with standard HCl. Calculation showed that the ester was less than 5 percent hydrolyzed.

For comparison, sodium octadecylsulfate (a straight chain alcohol derivative) was hydrolyzed more than 50 percent under the same conditions.

The monoethanolamine and triethanol amine salts were valuable as detergents.

EXAMPLE VI 2-methyl-2-norcamphanemethanol was treated with two molecular proportions of sulfur trioxide to give the dialkyl sulfate having the structure

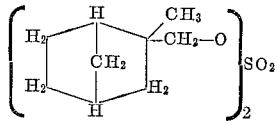

The product was useful as a plasticizer and as an additive for lubricating oils.

EXAMPLE VII 2-ethyl-2-cyclohexanemethanol was treated with one mole of sulfur trioxide to form the acid sulfate which was useful as an ore flotation agent. The magnesium, calcium and barium salts were useful as oil additives.

EXAMPLE VIII

2 - methyl - 3 - cyclohexyl - 2 - cyclohexanemethanol was treated with sulfur trioxide to form the acid sulfate. The sodium and potassium salts were strong surfactants.

EXAMPLE IX 2,3-dimethyl-2-norcamphanemethanol was treated with sulfur trioxide to form the acid sulfate. The alkaline earth metal salts were useful for increasing the lubricity of ester-type synthetic lubricants. For example, two percent of the barium salt was added to 2,2-diethyl-1,3-propylene dipelargonate to produce an extreme pressure lubricant.

As set forth above and as indicated in the examples included herein, the new compositions of the invention find special usefulness as wetting agents, extreme pressure lubricants, additives for increasing the lubricity of synthetic lubricants, surfactants, emulsifying agents, degreasing agents, plasticizers and the like. Among the distinguishing features of these new compounds are their thermal and hydrolytic stability which derive from the unique neopentyl structure persent in the molecule. Because of these outstanding stability properties the compounds of the invention are valuable for use under severe conditions which would cause extensive hydrolysis or thermal decomposition of related compounds of the prior art.

Although the invention has been described in considerable detail with particular reference to certain preferred embodiments thereof, variations and modifications can be effected within the spirit and scope of the invention as described hereinabove, and as defined in the appended claims.

I claim:
1. Sulfate and acid sulfate esters of cyclic neopentyl alcohols selected from the group consisting of compounds having the following structural formulae

(R—Y—O)₂SO₂

R—Y—O—SO₃M wherein R is a substituent selected from the group consisting of hydrogen and straight and branched chain alkyl radicals containing from 1–10 carbon atoms, cyclohexyl, phenyl and wherein Y is selected from the group consisting of

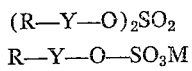

wherein R' is an alkyl group containing 1–4 carbon atoms, and wherein M is an ion selected from the class consisting of hydrogen, the alkali metals, the alkaline earth metals and amines from the group of monobutylamine, dibutylamine, tributyl amine, monoethanol amine, triethanol amine, dodecylamine, N,N-diethylcyclohexylamine.

2. Sulfate esters of cyclic neopentyl alcohols selected from the group consisting of compounds having the following structural formula (R—Y—O)₂SO₂ wherein R is a substituent selected from the group consisting of straight and branched chain alkyl radicals containing from 1–10 carbon atoms, cyclohexyl, phenyl and wherein Y is selected from the group consisting of

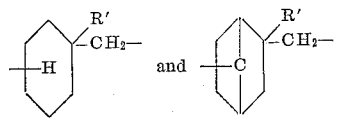

wherein R' is an alkyl group containing 1–4 carbon atoms.

3. Acid sulfate esters of cyclic neopentyl alcohols selected from the group consisting of compounds having the following structural formula

R—Y—O—SO₃M wherein R is a substituent selected from the group consisting of hydrogen and straight and branched chain alkyl radicals containing from 1–10 carbon atoms, cyclohexyl, phenyl and wherein Y is selected from the group consisting of

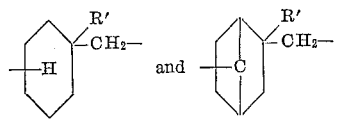

wherein R' is an alkyl group containing 1–4 carbon atoms, and wherein M is an ion selected from the class consisting of hydrogen, the alkali metals, the alkaline earth metals and amines from the group of monobutylamine, dibutylamine, tributyl amine, monoethanol amine, triethanol amine, dodecylamine, N,N-diethylcyclohexylamine.

4. Sulfate and acid sulfate esters of cyclic neopentyl alcohols selected from the group consisting of compounds having the following structural formulae (R—Y—O)₂SO₂

R—Y—O—SO₃M wherein R is selected from the group consisting of hydrogen and methyl and Y is selected from the group consisting of

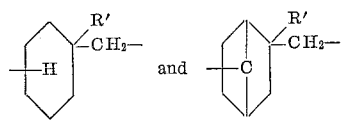

wherein R' is an alkyl group containing 1–4 carbon atoms, and wherein M is an ion selected from the class consisting of hydrogen, the alkali metals, the alkaline earth metals and amines from the group of monobutylamine, dibutylamine, tributyl amine, monoethanol amine, triethanol amine, dodecylamine, N,N-diethylcyclohexylamine.

5. Bis(2-methyl-2-cyclohexylmethyl) sulfate.
6. Bis(2-methyl-2-norcamphylmethyl) sulfate.
7. 2-methyl-2-norcamphylmethyl hydrogen sulfate.
8. 2,3-dimethyl-2-norcamphylmethyl hydrogen sulfate.

References Cited

UNITED STATES PATENTS

| | | | |
|---|---|---|---|
| 2,318,296 | 5/1943 | Dickey | 260—457 XR |
| 2,354,774 | 8/1944 | Rummelsburg | 260—457 |

FOREIGN PATENTS 695,547   8/1953   Great Britain.

OTHER REFERENCES

Lloyd et al.: Biochim. et Biophys. Acta, vol. 52, pp. 413–419 (1961).

CHARLES B. PARKER, *Primary Examiner.*

FLOYD D. HIGEL, *Assistant Examiner.*